US008776500B2

(12) United States Patent
Gonze et al.

(10) Patent No.: US 8,776,500 B2
(45) Date of Patent: Jul. 15, 2014

(54) SYSTEM AND METHOD FOR HYDROCARBON ADSORBER REGENERATION IN A HYBRID VEHICLE

(75) Inventors: Eugene V. Gonze, Pinckney, MI (US); Halim G. Santoso, Novi, MI (US); Bryan N. Roos, West Bloomfield, MI (US)

(73) Assignee: GM Global Technology Operations LLC

( * ) Notice: Subject to any disclaimer, the term of this patent is extended or adjusted under 35 U.S.C. 154(b) by 214 days.

(21) Appl. No.: 13/431,396

(22) Filed: Mar. 27, 2012

(65) Prior Publication Data

US 2013/0255227 A1 Oct. 3, 2013

(51) Int. Cl.
*F01N 3/00* (2006.01)

(52) U.S. Cl.
USPC .......... 60/286; 60/274; 60/284; 60/300; 60/303; 180/65.21; 180/65.31; 180/309

(58) Field of Classification Search
USPC .......... 60/274, 284, 286, 289, 295, 297, 300, 60/303; 180/65.21, 65.28, 65.29, 65.31, 180/309
See application file for complete search history.

(56) References Cited

U.S. PATENT DOCUMENTS

| | | | |
|---|---|---|---|
| 5,467,594 A | 11/1995 | Aoki et al. | |
| 5,761,902 A | 6/1998 | Usami et al. | |
| 5,802,845 A * | 9/1998 | Abe et al. | 60/274 |
| 5,979,157 A * | 11/1999 | Kinugasa et al. | 60/274 |
| 6,059,057 A | 5/2000 | Yamazaki et al. | |
| 6,122,910 A * | 9/2000 | Hoshi et al. | 60/297 |
| 6,327,852 B1 | 12/2001 | Hirose | |
| 6,477,831 B1 * | 11/2002 | Ballinger et al. | 60/284 |
| 6,856,034 B2 | 2/2005 | Peters et al. | |
| 6,912,840 B2 * | 7/2005 | Posselt et al. | 60/274 |
| 7,778,767 B2 | 8/2010 | Santoso et al. | |
| 7,792,627 B1 | 9/2010 | Santoso et al. | |
| 8,104,269 B2 * | 1/2012 | Gonze et al. | 60/286 |
| 8,627,654 B2 | 1/2014 | Roos et al. | |
| 2004/0083716 A1 | 5/2004 | Twigg | |
| 2007/0204601 A1 | 9/2007 | Ishii et al. | |
| 2007/0283684 A1 | 12/2007 | Matsubara | |
| 2008/0028746 A1 | 2/2008 | Matsubara et al. | |
| 2008/0236148 A1 | 10/2008 | Ichimoto | |

(Continued)

OTHER PUBLICATIONS

U.S. Appl. No. 13/196,263, filed Aug. 2, 2011, Roos et al.

*Primary Examiner* — Binh Q Tran

(57) ABSTRACT

A control system for a hybrid vehicle is presented. The control system can include an air/fuel ratio control module that selectively commands a rich air/fuel ratio upon starting an engine based on a temperature of an electrically heated catalyst (EHC) in an exhaust system of the engine, wherein the EHC includes a hydrocarbon (HC) adsorber. The control system can include an air pump control module that selectively activates an air pump supplying air into the exhaust system upstream from the EHC based on whether the engine is on and at least one of whether the HC adsorber is full and whether the EHC is saturated with oxygen. The control system can also include an electric heater control module that selectively activates an electric heater of the EHC based on whether the engine is on and the temperature of the EHC, as well as whether the HC adsorber is full.

15 Claims, 3 Drawing Sheets

(56) References Cited

U.S. PATENT DOCUMENTS

| | | |
|---|---|---|
| 2008/0282673 A1 | 11/2008 | Gonze et al. |
| 2008/0282686 A1 | 11/2008 | Gonze et al. |
| 2009/0025371 A1 | 1/2009 | Hermansson et al. |
| 2009/0133388 A1 | 5/2009 | Watanabe et al. |
| 2010/0115927 A1 | 5/2010 | Sano et al. |
| 2010/0205939 A1 | 8/2010 | Sano et al. |
| 2010/0256849 A1 | 10/2010 | Akimoto |
| 2010/0319327 A1 | 12/2010 | Sano et al. |
| 2011/0072802 A1 | 3/2011 | Bidner et al. |

* cited by examiner

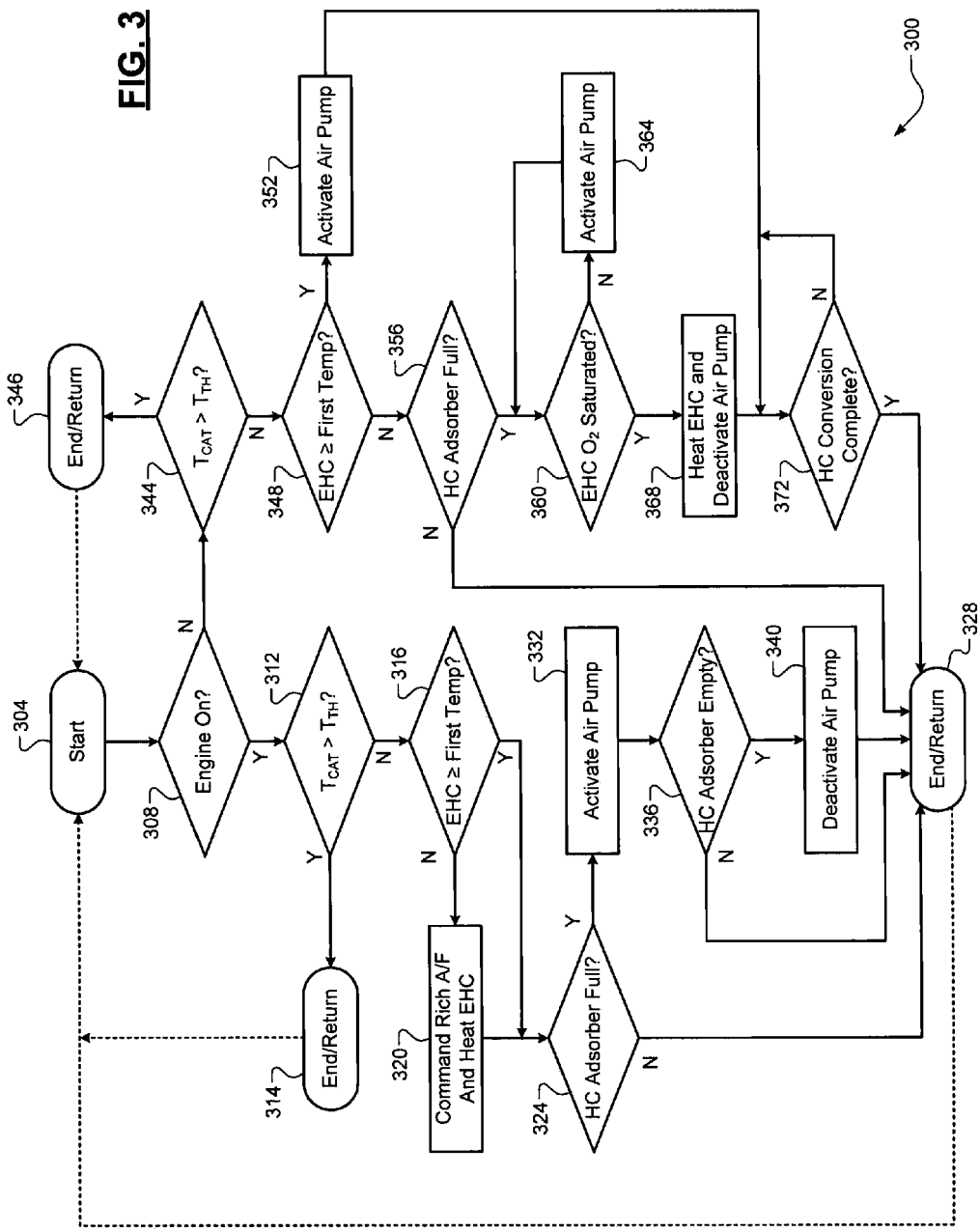

SYSTEM AND METHOD FOR HYDROCARBON ADSORBER REGENERATION IN A HYBRID VEHICLE

FIELD

The present disclosure relates to vehicle emission control systems and, more particularly, to a system and method for hydrocarbon adsorber regeneration in a hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine draws air into an intake manifold through an induction system that may be regulated by a throttle. The air in the intake manifold is distributed to a plurality of cylinders and combined with fuel to create an air/fuel mixture. The air/fuel mixture is compressed and combusted within the cylinders to drive pistons that rotatably turn a crankshaft and generate drive torque. The drive torque is transferred to a driveline of a vehicle via a transmission. Exhaust gas resulting from combustion is expelled from the cylinders into an exhaust manifold. An exhaust treatment system treats the exhaust gas to reduce emissions. For example, the exhaust treatment system may include a three-way catalyst, e.g., a catalytic converter, which is capable of treating the exhaust gas to reduce each of carbon monoxide, nitrogen oxides, and volatile organic compounds.

SUMMARY

A control system for a hybrid vehicle is presented. The control system can include an air/fuel ratio control module, an air pump control module, and an electric heater control module. The air/fuel ratio control module can selectively command a rich air/fuel ratio upon starting an engine of the hybrid vehicle based on a temperature of an electrically heated catalyst (EHC) in an exhaust system of the engine, wherein the EHC includes a hydrocarbon (HC) adsorber. The air pump control module can selectively activate an air pump supplying air into the exhaust system upstream from the EHC based on whether the engine is on and at least one of whether the HC adsorber is full and whether the EHC is saturated with oxygen. The electric heater control module can selectively activate an electric heater of the EHC based on whether the engine is on and the temperature of the EHC.

A method for controlling a hybrid vehicle is also presented. The method can include selectively commanding a rich air/fuel ratio upon starting an engine of the hybrid vehicle based on a temperature of an electrically heated catalyst (EHC) in an exhaust system of the engine, wherein the EHC includes a hydrocarbon (HC) adsorber. The method can include selectively activating an air pump supplying air into the exhaust system upstream from the EHC based on whether the engine is on and at least one of whether the HC adsorber is full and whether the EHC is saturated with oxygen. The method can also include selectively activating an electric heater of the EHC based on whether the engine is on and the temperature of the EHC.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a flow diagram illustrating an example method for hydrocarbon adsorber regeneration in a hybrid vehicle according to some implementations of the present disclosure.

DETAILED DESCRIPTION

Figure 1:
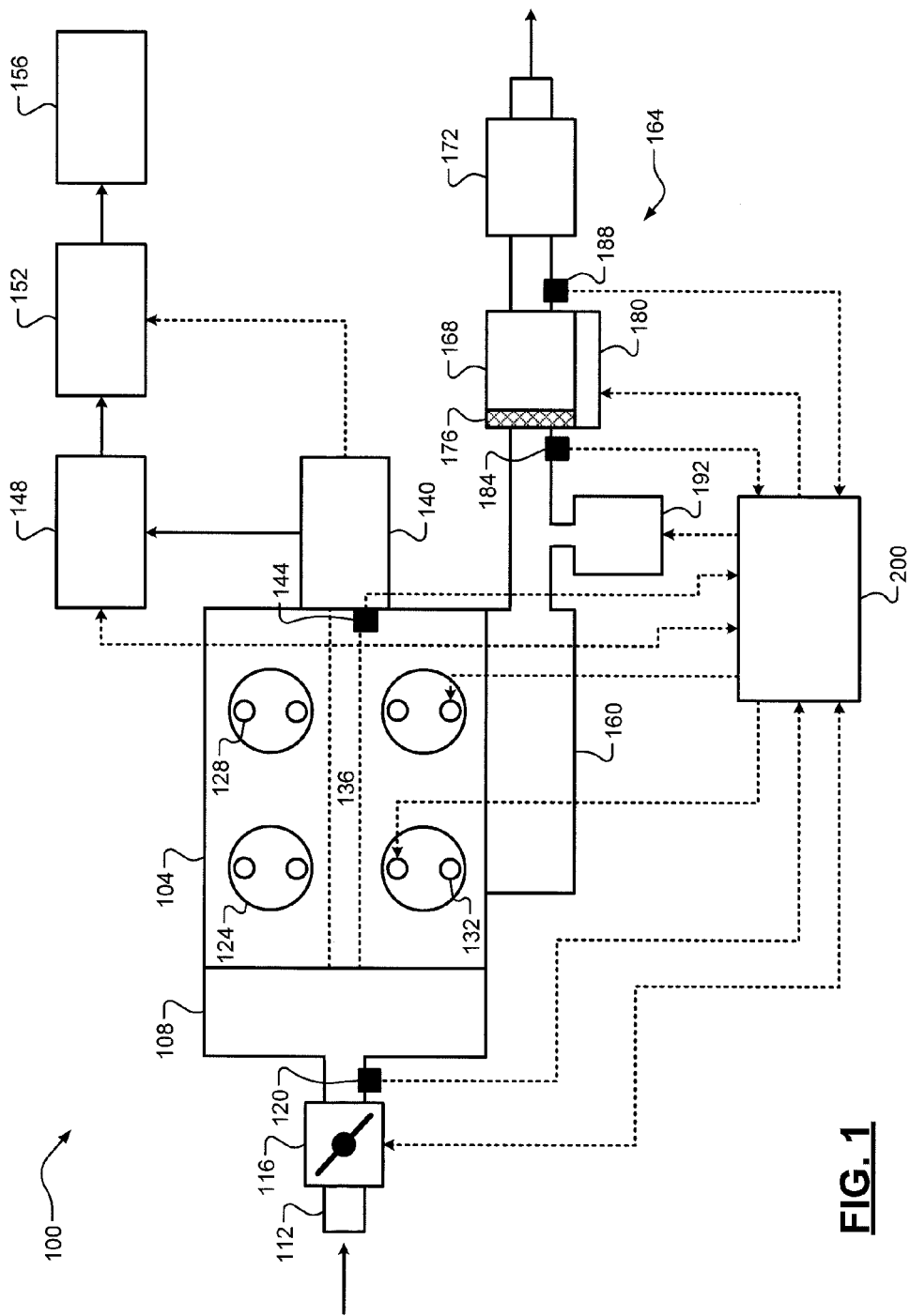
FIG. 1 is schematic illustration of an example hybrid vehicle according to some implementations of the present disclosure.

A hybrid vehicle can refer to a vehicle capable of being propelled using an internal combustion engine and/or an electric motor powered by a battery system. As previously described, the internal combustion engine can include an exhaust treatment system for treating exhaust gas produced by combustion. For example, the exhaust treatment system can include a three-way catalyst, e.g., a catalytic converter, which is capable of treating each of carbon monoxide (CO), nitrogen oxides (NOx), and volatile organic compounds (VOC).

During particular operating conditions, e.g., low load, the hybrid vehicle may be propelled using only the electric motor and the battery system. These periods may be referred to as engine-off periods and can vary from, for example only, a few seconds to a plurality of days. The performance of the three-way catalyst, however, is dependent upon the temperature of the three-way catalyst. One way to heat the three-way catalyst is via the exhaust gas produced by the engine. During engine-off periods, however, the engine does not produce exhaust gas.

The engine could be turned on in order to heat the three-way catalyst. Turning the engine on during periods when the electric motor and battery system are sufficient, however, decreases fuel economy. Additionally or alternatively, an electric heater can be added to the exhaust treatment system to heat the three-way catalyst. For example, the electric heater may be powered by the battery system and/or a conventional vehicle battery. Heating the three-way catalyst using an electric heater, however, may be slow—particularly during cold-start conditions.

Accordingly, a system and method are presented for HC adsorber regeneration in a hybrid vehicle. The system and method generally provide for heating of a three-way catalyst (TWC) in an exhaust treatment system by performing HC adsorber regeneration during engine-off periods. The HC adsorber can be included in an electrically heated catalyst (EHC) located upstream from the TWC in the exhaust treatment system. For example, the EHC may be a TWC that is partially or entirely coated in an HC adsorbing material. The EHC can also include an electric heater configured to heat the EHC.

The HC adsorber can be regenerated during engine-off periods to remove stored HC content from the TWC for additional engine run time by warming the TWC to its activation temperature. If the vehicle remains in an engine off mode for a long period of time, the regeneration may prepare the HC adsorber for a potential engine cold start where the TWC cannot effectively reduce emissions. An air pump can provide air at a location upstream from the EHC in the exhaust treatment system. The air pump can be activated in order to saturate the EHC with oxygen. Saturating the EHC with oxygen provides the oxygen in order for the EHC to be electrically heated to catalyze the HC and the oxygen to generate high temperature carbon dioxide ($CO_2$) and water ($H_2O$) according to the following exothermic equation:

$$HC+O_2 \rightarrow CO_2+H_2O.$$

The HC adsorber can be filled (or "loaded") during engine-on periods by initially operating the engine at a rich air/fuel ratio. Operating the engine at the rich air/fuel ratio causes the engine to produce exhaust gas having large amounts of HC, but small amounts of NOx. For example, the engine can be operated at the rich air/fuel ratio for a first period, which can be modeled based on a period to fill the HC adsorber. The air pump can also be activated to purge the HC adsorber in order to prevent excess HC from not being adsorbed by the HC adsorber.

Referring now to FIG. 1, an example hybrid vehicle 100 is illustrated. The hybrid vehicle 100 can include an engine 104. For example, the engine 104 can be a spark ignition (SI) engine. The engine 104 could also be another suitable type of engine such as a compression ignition (CI) engine, e.g., a diesel engine, or a homogeneous charge compression ignition (HCCI) engine. The engine 104 draws air into an intake manifold 108 through an induction system 112 that may be regulated by a throttle 116. For example, the throttle 116 may be electrically controlled using electronic throttle control (ETC). A mass air flow (MAF) sensor 120 measures MAF into the intake manifold 108.

The engine 104 can include a plurality of cylinders 124. While the engine 104 is shown to have four cylinders, it should be appreciated that the engine 104 can include other numbers of cylinders. The air in the intake manifold 108 is distributed to the cylinders 124 and combined with fuel from fuel injectors 128 to create an air/fuel mixture. The fuel injectors 128 can inject the fuel at intake ports of the cylinders 124, respectively (port fuel injection), or directly into the cylinders 124 (direct fuel injection). The air/fuel mixture is compressed by pistons (not shown) within the cylinders 124 and the compressed air/fuel mixture is ignited by spark from spark plugs 132.

The combustion of the air/fuel mixture drives the pistons (not shown), which rotatably turns a crankshaft 136 and generates drive torque. An engine speed sensor 144 can measure a rotational speed, e.g., in revolutions per minute, of the crankshaft 136. The drive torque at the crankshaft 136 drives a generator 140, which provides electrical power to a battery system 148 of the hybrid vehicle 100. The battery system 148 provides electrical power to the electric motor 152. The electric motor 152 provides drive torque, e.g., via a transmission (not shown), to a driveline 156, e.g., wheels, of the hybrid vehicle 100. While the generator 140 is shown to provide electrical power to the battery system 148, it should be appreciated that the generator 140 could provide electrical power directly to the electric motor 152.

Exhaust gas resulting from combustion is expelled from the cylinders 124 into an exhaust manifold 160. The exhaust gas in the exhaust manifold 160 can then be treated by an exhaust treatment system 164 to reduce emissions. The exhaust treatment system 164 can include an EHC 168 disposed upstream from a TWC 172. The EHC 168 can further include an HC adsorber 176. The HC adsorber 176 can adsorb HC from exhaust gas produced by the engine 104. The EHC 168 can also include an electric heater 180 configured to heat the EHC 168. The exhaust treatment system 160 can further include a first oxygen sensor 184 disposed upstream from the EHC 168 and a second oxygen sensor 188 disposed downstream from the EHC 168. An air pump 192 can also be disposed upstream from the EHC 168 and can be configured to introduce air into the exhaust treatment system 164.

Figure 2:
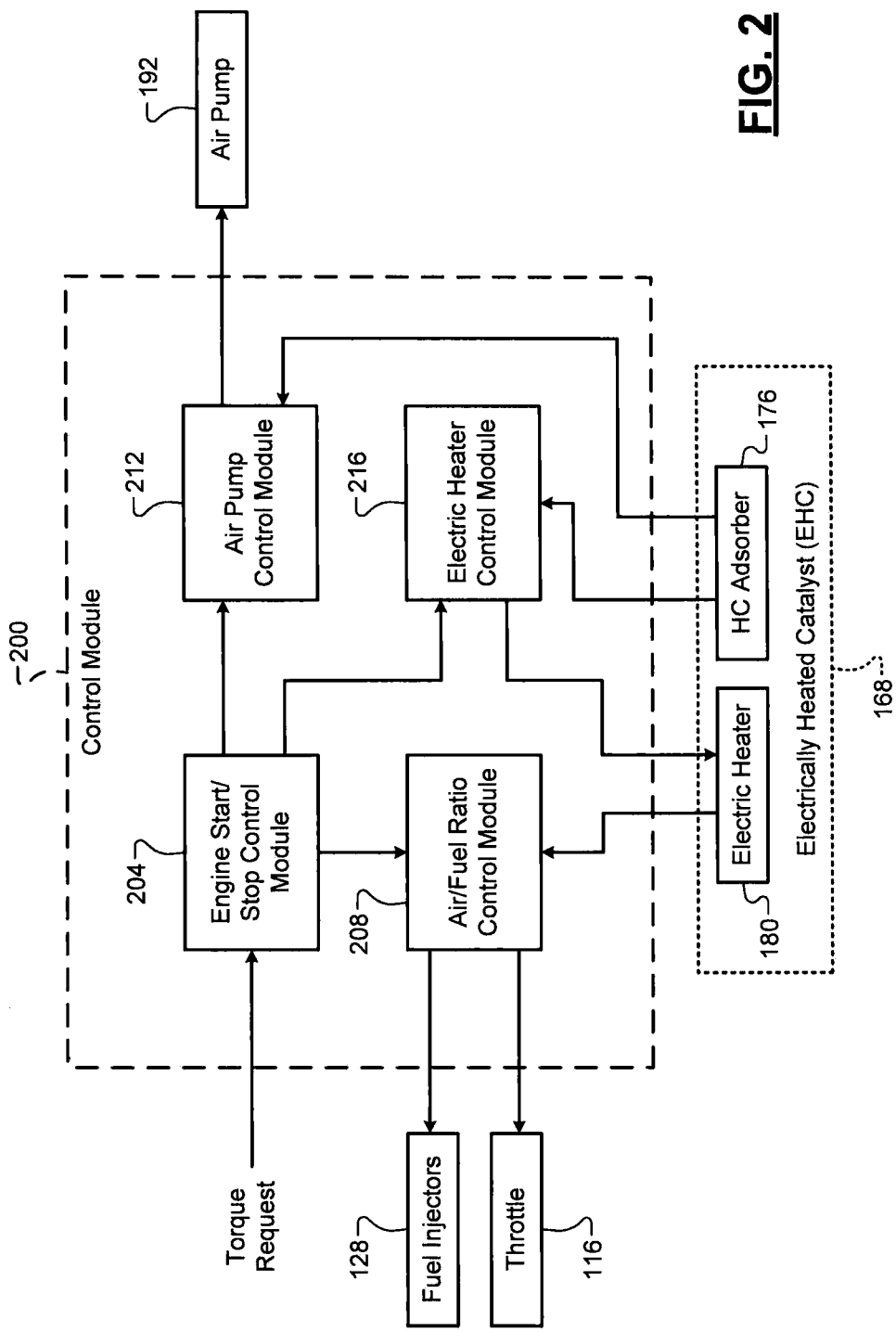
FIG. 2 is a functional block diagram of the example control module of FIG. 1 according to some implementations of the present disclosure.

Referring now to FIG. 2, the example control module 200 is illustrated. The control module 200 can include an engine start/stop control module 204, an air/fuel ratio control module 208, an air pump control module 212, and an electric heater control module 216.

The engine start/stop control module 204 controls start/stop operations of the engine 104. The engine start/stop control module 204 can control start/stop operations of the engine 104 based on a torque request. The torque request can be wholly or partially based on input from a driver of the hybrid vehicle, e.g., via an accelerator pedal. For example, the engine start/stop control module 204 can start the engine 104 when the torque request is greater than or equal to a predetermined threshold, and the engine start/stop control module 204 can stop the engine 104 when the torque request is less than the predetermined threshold. The predetermined threshold can indicate a torque request that cannot be handled by the battery system 148 and the electric motor 152. It should be appreciated that the torque request can also be based on other operating parameters and operating conditions.

The air/fuel ratio control module 208 can control an air/fuel ratio for operation of the engine 104. Controlling the air/fuel ratio can include adjusting fuel supplied to the engine 104, e.g., the fuel injectors 128, and/or adjusting airflow to the engine 104, e.g., the throttle 116. Specifically, the air/fuel ratio control module 208 can selectively command a rich air/fuel ratio upon starting the engine 104 based on a temperature of the EHC 168. For example, the air/fuel ratio control module 208 can command the rich air/fuel ratio upon starting the engine 104 when the temperature of the EHC 168 is less than a first temperature. The air/fuel ratio control module 208 can determine the temperature of the EHC 168 using a temperature sensor, a temperature model, or based on a temperature of the exhaust gas. The first temperature can indicate a temperature at which the TWC 172 cannot effectively reduce emissions from the engine, and thus HC emissions content may be stored in the HC adsorber 176.

The air/fuel ratio control module 208 can command the rich A/F ratio upon starting the engine 104 for a first period. The first period can be modeled based on one or more engine operating parameters such that HC in exhaust gas produced by the engine 104 during the rich A/F ratio operation completely fills the HC adsorber 176. The air/fuel ratio control module 208 can then command a predetermined air/fuel ratio for operation of the engine 104 after the first period. Additionally, the air/fuel ratio control module 208 can command the predetermined air/fuel ratio upon starting the engine 104 when the temperature of the EHC 168 is greater than or equal to the first temperature. The predetermined air/fuel ratio can be associated with normal operation of the engine, and therefore can be leaner than (greater than) the rich air/fuel ratio.

The air pump control module 212 can control operation of the air pump 192. The air pump control module 212 can selectively activate the air pump 192 based on whether the engine 104 is on and at least one of whether the HC adsorber 176 is full and whether the EHC 168 is saturated with oxygen. Specifically, the air pump control module 212 can activate the air pump 192 when the engine 104 is off and the EHC 168 is not saturated with oxygen, and the air pump control module 212 can deactivate the air pump 192 when the engine 104 is off and the EHC 168 is saturated with oxygen. The air pump control module 212 determines whether the EHC 168 is saturated with oxygen based on measurements from the oxygen sensors 184, 188 upstream and downstream from the EHC 168, respectively. The air pump control module 212 can also activate the air pump 192 to purge the HC adsorber 176 when the engine 104 is on and the HC adsorber 176 has adsorbed a maximum amount of HC, e.g., full capacity.

The electric heater control module 216 can control operation of the electric heater 180 of the EHC 168. The electric heater control module 216 can selectively activate the electric heater 180 of the EHC 168 based on whether the engine 104 is on and the temperature of the EHC 168. Specifically, the electric heater control module 216 can activate the electric heater 180 of the EHC 168 when the engine 104 is off and the EHC 168 is saturated with oxygen. For example, the electric heater control module 216 can activate the electric heater 180 of the EHC 168 until conversion of the HC stored in the HC adsorber 176 has completed. The electric heater control module 216 can also activate the electric heater 180 of the EHC 168 upon starting the engine 104.

Referring now to FIG. 3, an example method 300 for HC adsorber regeneration in a hybrid vehicle is illustrated. For example, the method 300 can be implemented for regeneration of the HC adsorber 176 of the hybrid vehicle 100. The method 300 could be executed by one or more processors, e.g., of the control module 200. At 304, the method 300 begins.

At 308, the method 300 can determine whether the engine 104 is on. If true, the method 300 can proceed to 312. If false, the method 300 can proceed to 344. At 312, the method 300 can determine whether a temperature of the TWC 172 ($T_{CAT}$) is greater than a predetermined threshold ($T_{TH}$) required for appropriate operation of the TWC 172. If true, the method 300 can end at 314 or return to 304 for one or more additional cycles. If false, the method 300 can proceed to 316. At 316, the method 300 can determine whether the temperature of the EHC 168 is greater than or equal to the first temperature. If true, the method 300 can proceed to 324. If false, the method 300 can proceed to 320.

At 320, the method 300 can command the rich air/fuel ratio for operation of the engine 104 and heat the EHC 168, e.g., activate the electric heater 180. The rich air/fuel ratio operation can continue for the first period. At 324, the method 300 can determine whether the HC adsorber 176 is full. If true, the method 300 can proceed to 332. If false, the method 300 can end at 328 or return to 304 for one or more additional cycles. At 332, the method 300 can activate the air pump 192. At 336, the method 300 can determine whether the HC adsorber 176 is empty. If true, the method 300 can proceed to 340. If false, the method 300 can end at 328 or return to 304 for one or more additional cycles. At 340, the method 300 can deactivate the air pump 192. The method 300 can then end at 328 or return to 304 for one or more additional cycles.

At 344, the method 300 can determine whether the temperature of the TWC 172 ($T_{CAT}$) is greater than the predetermined threshold ($T_{TH}$) required for appropriate operation of the TWC 172. If true, the method 300 can end at 346 or return to 304 for one or more additional cycles. If false, the method 300 can proceed to 348. At 348, the method 300 can determine whether the temperature of the EHC 168 is greater than or equal to the first temperature. If true, the method 300 can proceed to 352. If false, the method 300 can proceed to 356. At 352, the method 300 can activate the air pump 192. The method 300 can then proceed to 372.

At 356, the method 300 can determine whether the HC adsorber 176 is full. If true, the method 300 can proceed to 360. If false, the method 300 can end at 328 or return to 304 for one or more additional cycles. At 360, the method 300 can determine whether the EHC 176 is saturated with oxygen. If true, the method 300 can proceed to 368. If false, the method 300 can proceed to 364. At 364, the method 300 can activate the air pump 192. The method 300 can then return to 360. At 368, the method 300 can heat the EHC 168, e.g., activate the electric heater 180, and deactivate the air pump 192. At 372, the method 300 can determine whether conversion of the HC stored in the HC adsorber 176 has completed. If true, the method 300 can end at 328 or return to 304 for one or more additional cycles. If false, the method 300 can return to 372 (continue heating).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An exhaust treatment system for a hybrid vehicle, the exhaust treatment system comprising:

an electrically-heated catalyst (EHC) configured to receive exhaust gas from an engine of the hybrid vehicle and including an electric heater and a hydrocarbon (HC) adsorber;

a three-way catalyst (TWC) located downstream from the EHC, wherein the TWC is not electrically heated;

an air/fuel ratio control module that selectively commands a rich air/fuel ratio for a first period upon starting an engine of the hybrid vehicle when a temperature of the EHC is less than a first temperature, wherein the first period is sufficient to fill the HC adsorber;

an air pump control module that selectively activates an air pump supplying air into the exhaust system upstream from the EHC based on whether the engine is on and at least one of whether the HC adsorber is full and whether the EHC is saturated with oxygen; and an electric heater control module that selectively activates the electric heater of the EHC based on whether the engine is on and the temperature of the EHC, wherein the air pump control module selectively activates the air pump when the engine is off, the HC adsorber is full and the EHC is not saturated with oxygen.

2. An exhaust treatment system for a hybrid vehicle, the exhaust treatment system comprising:

an air/fuel ratio control module that selectively commands a rich air/fuel ratio upon starting an engine of the hybrid vehicle for a first period when a temperature of an electrically heated catalyst (EHC) in an exhaust system of the engine is less than a first temperature, wherein the EHC includes a hydrocarbon (HC) adsorber, and wherein the first period is sufficient to allow the HC adsorber to fill;

an air pump control module that selectively activates an air pump supplying air into the exhaust system upstream from the EHC based on whether the engine is on and at least one of whether the HC adsorber is full and whether the EHC is saturated with oxygen; and an electric heater control module that selectively activates an electric heater of the EHC based on whether the engine is on and the temperature of the EHC, wherein the air/fuel ratio control module commands a predetermined air/fuel ratio for operation of the engine upon starting the engine when the temperature of the EHC is greater than the first temperature or after the first period, wherein the predetermined air/fuel ratio is associated with normal operation of the engine, and wherein the predetermined air/fuel ratio is leaner than the rich air/fuel ratio.

3. The exhaust treatment system of claim 1, wherein the air pump control module deactivates the air pump when the engine is off and the EHC is saturated with oxygen.

4. The exhaust treatment system of claim 3, wherein the air pump control module determines whether the EHC is saturated with oxygen based on measurements from oxygen sensors upstream and downstream from the EHC.

5. An exhaust treatment system for a hybrid vehicle, the exhaust treatment system comprising:

an electrically-heated catalyst (EHC) configured to receive exhaust gas from an engine of the hybrid vehicle and including an electric heater and a hydrocarbon (HC) adsorber;

a three-way catalyst (TWC) located downstream from the EHC, wherein the TWC is not electrically heated;

an air/fuel ratio control module that selectively commands a rich air/fuel ratio for a first period upon starting an engine of the hybrid vehicle when a temperature of the EHC is less than a first temperature, wherein the first period is sufficient to fill the HC adsorber;

an air pump control module that selectively activates an air pump supplying air into the exhaust system upstream from the EHC based on whether the engine is on and at least one of whether the HC adsorber is full and whether the EHC is saturated with oxygen; and an electric heater control module that selectively activates the electric heater of the EHC based on whether the engine is on and the temperature of the EHC, wherein the electric heater control module activates the electric heater of the EHC when the engine is off and the EHC is saturated with oxygen, wherein the electric heater control module activates the electric heater of the EHC until conversion of the HC stored in the HC adsorber has completed.

6. The exhaust treatment system of claim 1, wherein the air pump control module activates the air pump to purge the HC adsorber when the engine is on and the HC adsorber has adsorbed a maximum amount of HC.

7. The exhaust treatment system of claim 1, wherein when a temperature of the TWC is greater than or equal to the first temperature upon starting the engine, the air/fuel ratio control module commands an air/fuel ratio for the engine corresponding to normal operation, and the air pump control module and the electric heater control module deactivate the air pump and the electric heater, respectively.

8. An exhaust treatment system for a hybrid vehicle, the exhaust treatment system comprising:

an air/fuel ratio control module that selectively commands a rich air/fuel ratio upon starting an engine of the hybrid vehicle based on a temperature of an electrically heated catalyst (EHC) in an exhaust system of the engine, wherein the EHC includes a hydrocarbon (HC) adsorber;

an air pump control module that selectively activates an air pump supplying air into the exhaust system upstream from the EHC based on whether the engine is on and at least one of whether the HC adsorber is full and whether the EHC is saturated with oxygen;

an electric heater control module that selectively activates an electric heater of the EHC based on whether the engine is on and the temperature of the EHC; and an engine start/stop control module that controls start/stop of the engine based on a torque request, wherein the engine start/stop control module starts the engine when the torque request is greater than or equal to a predetermined threshold, and wherein the engine start/stop control module stops then engine when the torque request is less than the predetermined threshold, wherein the predetermined threshold indicates a torque request that is greater than an electric motor of the hybrid vehicle can generate, wherein the electric motor is powered by a battery system.

9. A method for controlling a hybrid vehicle, the method comprising:

selectively commanding a rich air/fuel ratio for a first period upon starting an engine of the hybrid vehicle using a controller when a temperature of an electrically heated catalyst (EHC) in an exhaust system of the engine is less than a first temperature, wherein the EHC includes a hydrocarbon (HC) adsorber, and wherein the first period is sufficient to fill the HC adsorber;

selectively activating an air pump supplying air into the exhaust system upstream from the EHC using the controller based on whether the engine is on and at least one of whether the HC adsorber is full and whether the EHC is saturated with oxygen;

selectively activating an electric heater of the EHC using the controller based on whether the engine is on and the temperature of the EHC; and when the engine is off:
selectively activating the air pump using the controller when the EHC is not saturated with oxygen, and deactivating the air pump when the EHC is saturated with oxygen; and
selectively activating the electric heater of the EHC using the controller when the EHC is saturated with oxygen until conversion of the HC stored in the HC adsorber has completed.

10. A method for controlling a hybrid vehicle, the method comprising:
selectively commanding a rich air/fuel ratio using a controller upon starting an engine of the hybrid vehicle for a first period when a temperature of an electrically heated catalyst (EHC) in an exhaust system of the engine is less than a first temperature, wherein the EHC includes a hydrocarbon (HC) adsorber and wherein the first period is sufficient to allow the HC adsorber to fill;
selectively activating an air pump supplying air into the exhaust system upstream from the EHC using the controller based on whether the engine is on and at least one of whether the HC adsorber is full and whether the EHC is saturated with oxygen; and
selectively activating an electric heater of the EHC using the controller based on whether the engine is on and the temperature of the EHC,
commanding a predetermined air/fuel ratio for operation of the engine using the controller upon starting the engine when the temperature of the EHC is greater than or equal to the first temperature or after the first period, wherein the predetermined air/fuel ratio is associated with normal operation of the engine, and wherein the predetermined air/fuel ratio is leaner than the rich air/fuel ratio.

11. The method of claim 9, further comprising determining whether the EHC is saturated with oxygen based on measurements from oxygen sensors upstream and downstream from the EHC.

12. The method of claim 9, further comprising activating the air pump to purge the HC adsorber when the engine is on and the HC adsorber has adsorbed a maximum amount of HC.

13. The method of claim 9, wherein when a temperature of the TWC is greater than or equal to the first temperature upon starting the engine:
commanding an air/fuel ratio for the engine corresponding to normal operation;
deactivating the air pump; and
deactivating the electric heater.

14. A method for controlling a hybrid vehicle, the method comprising:
selectively commanding a rich air/fuel ratio using a controller upon starting an engine of the hybrid vehicle based on a temperature of an electrically heated catalyst (EHC) in an exhaust system of the engine, wherein the EHC includes a hydrocarbon (HC) adsorber;
selectively activating an air pump supplying air into the exhaust system upstream from the EHC using the controller based on whether the engine is on and at least one of whether the HC adsorber is full and whether the EHC is saturated with oxygen;
selectively activating an electric heater of the EHC using the controller based on whether the engine is on and the temperature of the EHC; and
controlling start/stop of the engine using the controller based on a torque request, wherein controlling start/stop of the engine includes starting the engine when the torque request is greater than or equal to a predetermined threshold, and stopping then engine when the torque request is less than the predetermined threshold, wherein the predetermined threshold indicates a torque request that is greater than an electric motor of the hybrid vehicle can generate, wherein the electric motor is powered by a battery system.

15. The exhaust treatment system of claim 1, wherein the air pump control module selectively controls the air pump to supply air to the EHC while the engine is on and after the HC adsorber is full to regenerate the HC adsorber and to heat the TWC located downstream from the EHC above a predetermined temperature without using electric heating.

* * * * *